US010723222B2

(12) United States Patent
Jeon (10) Patent No.: US 10,723,222 B2
(45) Date of Patent: Jul. 28, 2020

(54) OPENING AND CLOSING DEVICE FOR FUEL FILLER DOOR

(71) Applicants: Hyundai Motor Company, Seoul (KR); Kia Motors Corporation, Seoul (KR)

(72) Inventor: Kyu Nam Jeon, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 136 days.

(21) Appl. No.: 16/196,815

(22) Filed: Nov. 20, 2018

(65) Prior Publication Data

US 2020/0079210 A1    Mar. 12, 2020

(30) Foreign Application Priority Data

Sep. 11, 2018    (KR) .................... 10-2018-0108040

(51) Int. Cl.
*B60K 15/04*    (2006.01)

(52) U.S. Cl.
CPC .. *B60K 15/0406* (2013.01); *B60K 2015/0425* (2013.01)

(58) Field of Classification Search
CPC ............ B60K 15/04; B60K 2015/0461; B60K 2015/0422; B60K 15/05; B60K 2015/0419; B60K 2015/0515; B60K 15/0406; B60K 2015/0425
USPC ...................................................... 220/86.2
See application file for complete search history.

(56) References Cited

U.S. PATENT DOCUMENTS

| 2,543,214 A * | 2/1951 | Wildberg | ........... B60K 15/0406 200/61.81 |
| 2,611,503 A * | 9/1952 | Griswold | ............. B64D 37/005 220/244 |
| 5,462,190 A * | 10/1995 | Lienhart | ............ B60K 15/0406 220/375 |
| 6,478,360 B1 * | 11/2002 | Reutter | .............. B60K 15/0406 220/86.2 |
| 6,983,773 B1 * | 1/2006 | Hagano | .................. B60K 15/04 141/348 |
| 8,281,825 B2 * | 10/2012 | Yoshida | ............. B60K 15/0406 141/350 |
| 8,746,298 B2 * | 6/2014 | Gerdes | .................... B60K 15/04 141/350 |
| 2014/0251036 A1* | 9/2014 | Ishiguro | .................. E05C 19/02 74/55 |

FOREIGN PATENT DOCUMENTS

| JP | 4369588 B2 | 9/2009 |
| JP | 5004246 B2 | 6/2012 |
| KR | 10-2006-0032006 A | 4/2006 |
| KR | 10-1549932 B1 | 8/2015 |

* cited by examiner

*Primary Examiner* — Shawn M Braden
(74) *Attorney, Agent, or Firm* — Morgan, Lewis & Bockius LLP (57) ABSTRACT

An opening and closing device configured for a fuel filler door, may include a base fixedly mounted on a fuel filler housing; a link mechanism pivotably connected to the base; a slider linearly movably connected to the base; and a door bracket relatively pivotably connected to the link mechanism and the slider and fixedly connected to a fuel filler door.

12 Claims, 7 Drawing Sheets

OPENING AND CLOSING DEVICE FOR FUEL FILLER DOOR

CROSS REFERENCE TO RELATED APPLICATION

The present application claims priority to Korean Patent Application No. 10-2018-0108040, filed Sep. 11, 2018, the entire contents of which is incorporated herein for all purposes by this reference.

BACKGROUND OF THE INVENTION

Field of the Invention

The present invention generally relates to an opening and closing device for a fuel filler door and, more particularly, to an opening and closing device for automatically opening and closing a fuel filler door using power supplied by a motor.

Description of Related Art

A fuel filler housing is fixedly mounted on a rear chassis panel of a vehicle, and is opened or closed by a rotation of a fuel filler door.

A filler neck pipe is provided such that one end portion thereof is connected to a fuel tank and the other end portion thereof extends through the fuel filler housing. A fuel filler cap is attached to the other end portion of the filler neck pipe extending through the fuel filler housing. The fuel filler cap may be attached to and detached from the other end portion of the filler neck pipe by screw rotation.

Accordingly, when a user manipulates a switch in a cabin of a vehicle, the fuel filler door is unlocked by a release operation of a locking device, so that the fuel filler door is popped up by elastic force of a spring. As such, the user may get out the vehicle to open the fuel filler housing by manually rotating the fuel filler door. The fuel filler cap is removed from the opened fuel filler housing, a fuel injection nozzle is inserted into the filler neck pipe to inject fuel. When fuel injection is completed, the fuel filler cap is recoupled to the filler neck pipe, and the fuel filler door is manually closed, closing the opened fuel filler housing.

In the related art as described above, the opening and closing operations of the fuel filler door have been inconvenient, since the user may manually open or close the fuel filler door after having unlocked the locking device by manipulating the switch.

Furthermore, generally, a hinge used to connect the fuel filler housing and the fuel filler door is a gooseneck hinge. However, the gooseneck hinge is long in length while being bulky, which are problematic. A majority of the gooseneck hinge is exposed externally from the fuel filler housing when the fuel filler housing is opened. This may consequently lower an external appearance, which is problematic.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an opening and closing device configured for a fuel filler door, the opening and closing device being able to automatically open or close a fuel filler door using power supplied by a motor, improving the convenience of a user.

Furthermore, the opening and closing device configured for a fuel filler door according to an exemplary embodiment of the present invention can reduce a volume and size, since opening and closing device is configured to be accommodated in a fuel filler housing. A majority of the opening and closing device is located within the fuel filler housing even when the fuel filler door is opened. The present configuration can minimize external exposure of the opening and closing device, thereby improving an external appearance.

In various aspects of the present invention, there is provided an opening and closing device configured for a fuel filler door. The opening and closing device may include: a base fixedly mounted on a fuel filler housing; a link mechanism pivotably connected to the base; a slider linearly movably connected to the base; and a door bracket relatively pivotably connected to the link mechanism and the slider and fixedly connected to a fuel filler door The opening and closing device may further include a motor fixedly mounted on the fuel filler housing and connected to the link mechanism. The motor may rotate forwards or backwards to provide power for pivoting the link mechanism with respect to the base in a response to a switch being manipulated or forward thereof.

When the door bracket linearly moves with respect to the base in a response to pivoting of the link mechanism, the slider may linearly move along with the door bracket, and the fuel filler door may linearly move with respect to the fuel filler housing in an opening and closing direction thereof. When the door bracket pivots with respect to the slider in a response to pivoting of the link mechanism, the fuel filler door may rotate with respect to the fuel filler housing in the opening and closing direction thereof.

The base may include: a first guide and a second guide extending in the opening and closing direction of the fuel filler door to be parallel to each other; and a support guide mounted on the first guide to extend in a same direction as the first guide. The slider may linearly move, with both edge portions thereof being guided by the first guide and the second guide, and the door bracket linearly moves, with one edge portion thereof being guided by the support guide.

The base may have a guide groove extending in the opening and closing direction of the fuel filler door. The slider may include a stopper protrusion protruding from one end portion in a predetermined direction thereof, the stopper protrusion being inserted into and moving along the guide groove.

The slider may include a first protrusion protruding from the other end portion in an opposite direction of the stopper protrusion. A first hole into which the first protrusion is inserted may be provided in one end portion of the door bracket. The door bracket may be pivotably connected to the slider via the first protrusion and the first hole.

The link mechanism may include: a first link fitted into a second protrusion protruding from the base and connected to the motor to pivot about the second protrusion using power supplied by the motor; and a second link having one end portion relatively pivotably connected to the first link via a hinge and the other end portion relatively pivotably fitted around a third protrusion protruding from the door bracket.

The first link may have one end portion thereof and the other end portion protruding in both directions with respect to the second protrusion. The one end portion may include a fan-shaped worm wheel gear to be engaged with a worm gear of the motor. The other end portion may be pivotably connected to the second link via a hinge.

None of the base, the motor, and the first link may be exposed externally when the fuel filler door is opened When the motor rotates forwards, the fuel filler door may rotate after having linearly moved in a direction away from the fuel filler housing, so that the fuel filler housing is opened. When the motor rotates backwards in a position in which the fuel filler housing is opened, the fuel filler door may linearly move toward the fuel filler housing after having rotated in an order reverse to an operation of opening the fuel filler housing, so that the fuel filler housing is closed According to an exemplary embodiment of the present invention, when a driver manipulates a switch provided in a cabin of a vehicle, the opening operation and the closing operation of the fuel filler door may be automatically performed using power supplied by a motor. This can consequently improve the convenience of the user.

Furthermore, all components of the device connecting the fuel filler housing and the fuel filler are accommodated in the fuel filler housing. In particular, even when the fuel filler door is opened, none of the base, the motor, and the first link are exposed externally, and only portions of the second link, the slider, and the door bracket are exposed externally. The present configuration can consequently improve an external appearance.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, an opening and closing device configured for a fuel filler door according to an exemplary embodiment of the present invention will be described with reference to the accompanying drawings.

As illustrated in FIGS. 1 to 9, the opening and closing device configured for a fuel filler door may include a base 10 fixedly disposed on a fuel filler housing 1; a link mechanism 20 pivotably connected to the base 10; a slider 30 linearly movably connected to the base 10; a door bracket 40 relatively pivotably connected to the link mechanism 20 and the slider 30 and fixedly connected to a fuel filler door 2; and a motor 50 fixedly disposed on the fuel filler housing 1 and connected to the link mechanism 20 by gear engagement. The motor 50 rotates forwards or backwards in a response to a switch 3 being manipulated, providing power to pivot the link mechanism 20 with respect to the base 10.

The fuel filler housing 1 is fixedly connected to a chassis panel 4 of a rear fender of a vehicle. The fuel filler housing 1 is opened or closed by the operation of the fuel filler door 2. The switch 3 is provided in a position in a cab where a driver can reach a hand by extending an arm. When the driver manipulates the switch 3, the motor 50 rotates forwards (i.e., rotates clockwise) or rotates backwards (i.e., rotates counterclockwise) using current supplied thereto by a power supply 5.

For reference, the function of the switch 3 may be provided by manipulating a remote control from outside a vehicle, touching or pushing a fuel door, or the like.

Furthermore, one end portion of a filler pipe 6 connected to a fuel tank extends through the fuel filler housing 1. A fuel filler cap 7 is attached to the end portion of the filler pipe 6 extending through the fuel filler housing 1, such that the fuel filler cap 7 may be attached to and detached to the end portion of the filler pipe 6 by screw rotation.

According to the exemplary embodiment of the present invention, when pivoting of the link mechanism 20 causes the door bracket 40 to linearly move with respect to the base 10, the slider 30 linearly moves along with the door bracket 40. Consequently, fuel filler door 2 connected integrally with the door bracket 40 linearly moves with respect to the fuel filler housing 1 in an opening and closing direction thereof.

Furthermore, when the door bracket 40 rotates with respect to the slider 30 in a response to rotation of the link mechanism 20, the fuel filler door 2 integrally connected to the door bracket 40 rotates with respect to the fuel filler housing 1 in the opening and closing direction thereof.

The base 10 has a first guide 11 and a second guide 12 protruding therefrom and linearly extending in the opening and closing direction of the fuel filler door 2. A support guide 13 is additionally mounted on the first guide 11 to extend in the same direction as the first guide 11.

The first guide 11 and the support guide 13 are provided integrally in which the support guide 13 is located above the first guide 11. A guide protrusion 14 protrudes between the first guide 11 and the support guide 13 to define a boundary between the first guide 11 and the support guide 13 while configured as a guide when the slider 30 and the door bracket 40 move.

Thus, the slider 30 is configured to linearly move, with both longitudinal edge portions thereof being guided by the first and second guides 11 and 12. The door bracket 40 is configured to linearly move, with one longitudinal edge portion thereof being guided by the support guide 13.

A concave guide groove 15 is provided in the base 10 to extend in the opening and closing direction of the fuel filler door 2. A stopper protrusion 31 protrudes from one end portion of the slider 30 in one direction to be inserted into the guide groove 15, and moves along the guide groove 15.

The slider 30 is configured to linearly move in the opening and closing direction of the fuel filler door 2, with both the edge portions thereof being guided by the first and second guides 11 and 12. The stopper protrusion 31 inserted into the guide groove 15 functions as a stopper to limit the movement of the slider 30 through contact with both end portions of the guide groove 15 when the slider 30 linearly moves, preventing the slider 3 from dislodging from the base 10.

A first protrusion (or slider protrusion) 32 protrudes from the other end portion of the slider 30 in the opposite direction of the stopper protrusion 31. A first hole 41 into which the first protrusion 32 is inserted is provided in one end portion of the door bracket 40. Due to the first protrusion 32 and the first hole 41, the door bracket 40 is pivotably connected to the slider 30.

The link mechanism 20 includes a first link 21 fitted into a second protrusion (or base protrusion) 16 protruding from the base 10 and connected to the motor 50 to pivot about the second protrusion 16 using power supplied by the motor 50 and a second link 23 having one end portion relatively pivotably connected to the first link 21 via a hinge 22 and the other end portion relatively pivotably fitted around a third protrusion 42 (or bracket protrusion) protruding from the door bracket 40.

The second link 21 is configured such that one end portion 211 and the other end portion 212 protrude in opposite directions about the second protrusion 16. One end portion 211 is provided with a fan-shaped worm wheel gear 213, which is meshed with a worm gear 51 of the motor 50. The other end portion 212 is pivotably connected to the second link 23 via the hinge 22.

According to the exemplary embodiment of the present invention, when the door bracket 40 and the slider 30 linearly move due to pivoting of the link mechanism 20, the fuel filler door 2 linearly moves with respect to the fuel filler housing 1 in the opening and closing direction thereof. When the slider 30 does not linearly move with respect to the base 10 and only the door bracket 40 pivots with respect to the slider 30 in a response to pivoting of the link mechanism 20, the fuel filler door 2 starts to rotate with respect to the fuel filler door 2 in the opening and closing direction thereof, thereby opening or closing the fuel filler housing 1.

Furthermore, all components of the device according to an exemplary embodiment of the present invention are accommodated in the fuel filler housing 1. None of the base 10, the motor 50, and the first link 21 are exposed externally when the fuel filler door 2 is opened. When the fuel filler door 2 is opened, portions of the second link 23, the slider 30, and the door bracket 40 are opened externally. The present can consequently improve an external appearance.

The exemplary embodiment of the present invention is configured such that, when the motor 50 rotates forwards in a response to the switch 3 being manipulated, the fuel filler door 2 rotates after having linearly moved in the direction facing away from the fuel filler housing 1, so that the fuel filler housing 1 is opened. Furthermore, when the motor rotates backwards in a position in which the fuel filler housing 1 is opened, the fuel filler door 2 linearly moves after having rotated in the reverse order of the opening operation, so that the fuel filler housing 1 is closed.

Hereinafter, the operation of the exemplary embodiment of the present invention will be described.

Figure 1:
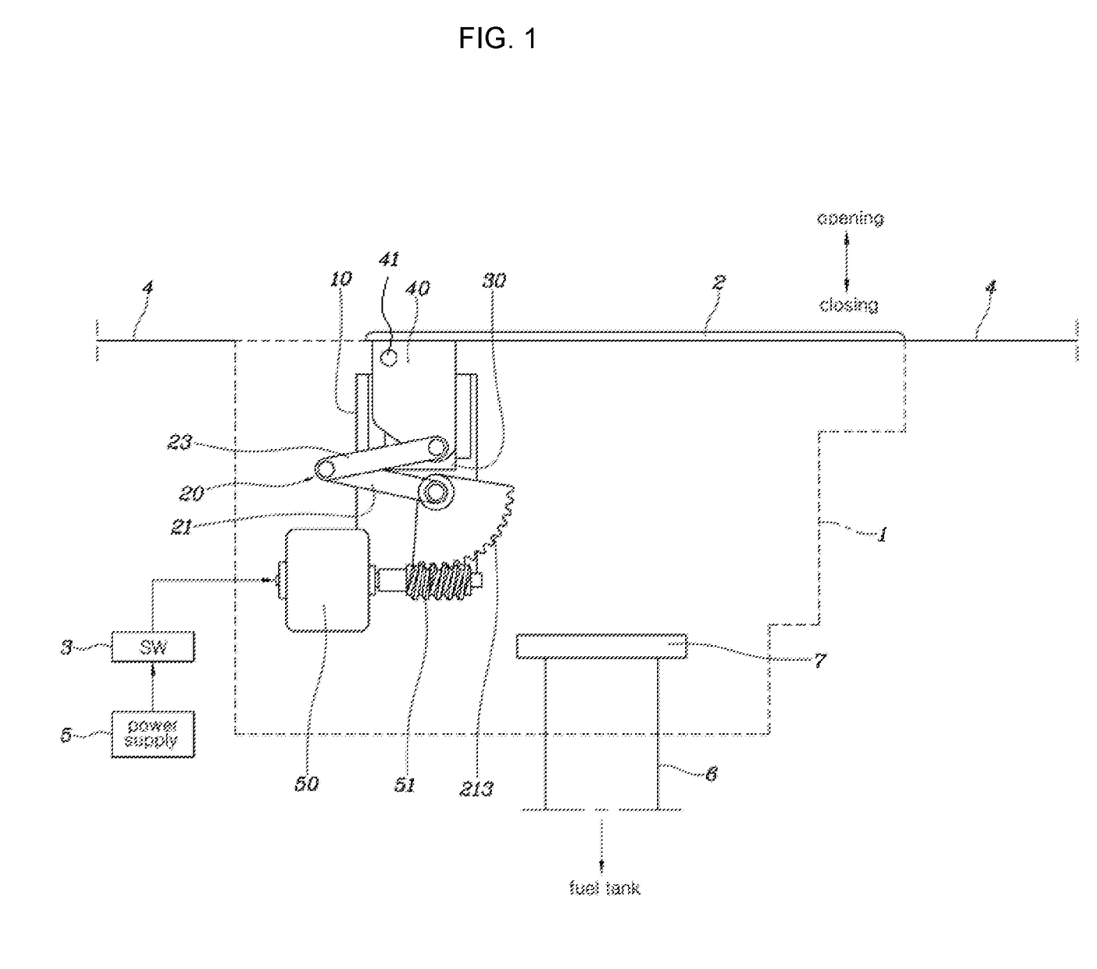
FIG. 1 illustrates a position in which a fuel filler door is closed by an opening and closing device configured for a fuel filler door according to an exemplary embodiment of the present invention.
Figure 2:
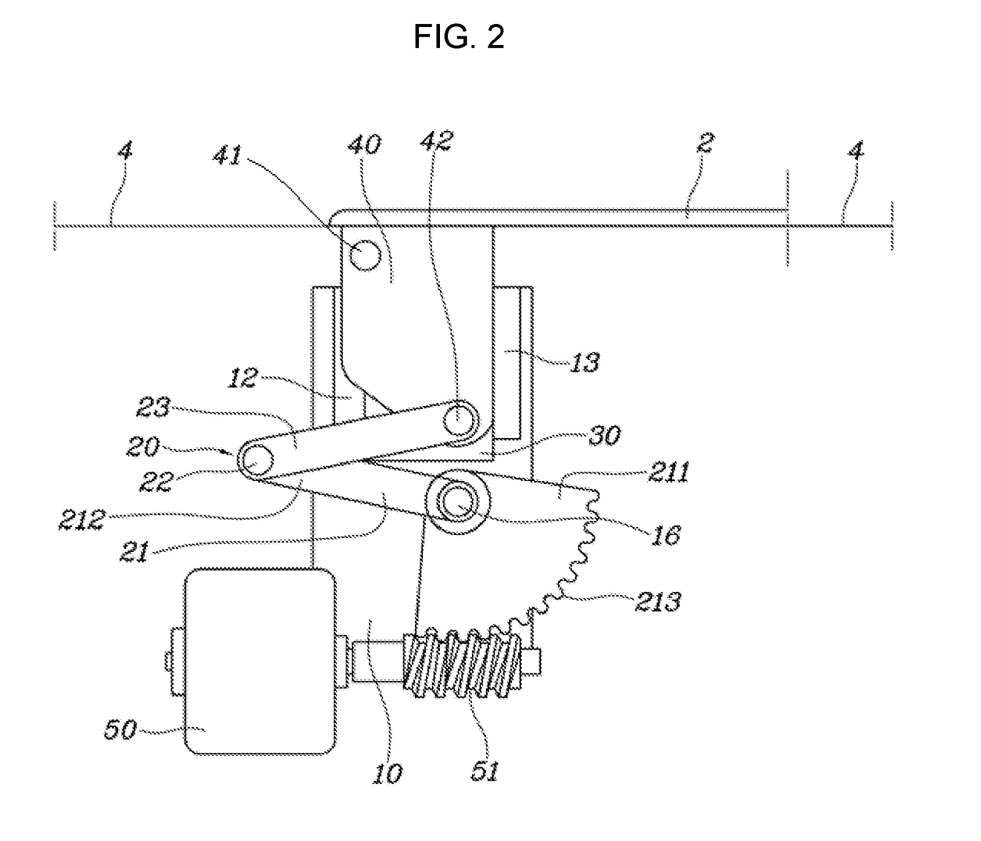
FIG. 2 is an enlarged view exemplarily illustrating a portion of FIG. 1 in which the opening and closing device is disposed.
Figure 3:
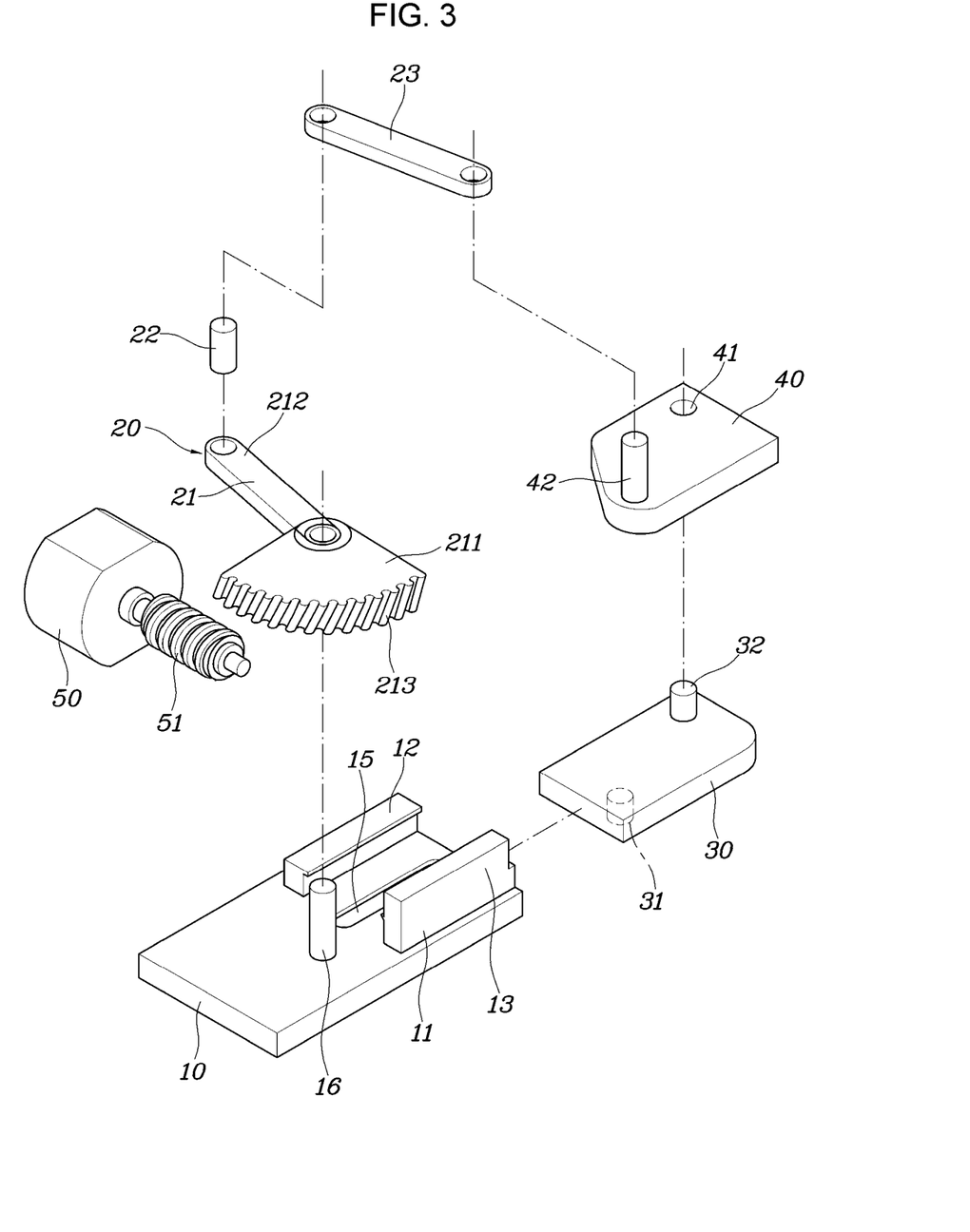
FIG. 3 is an enlarged perspective view exemplarily illustrating the opening and closing device configured for a fuel filler door according to an exemplary embodiment of the present invention.
Figure 4:
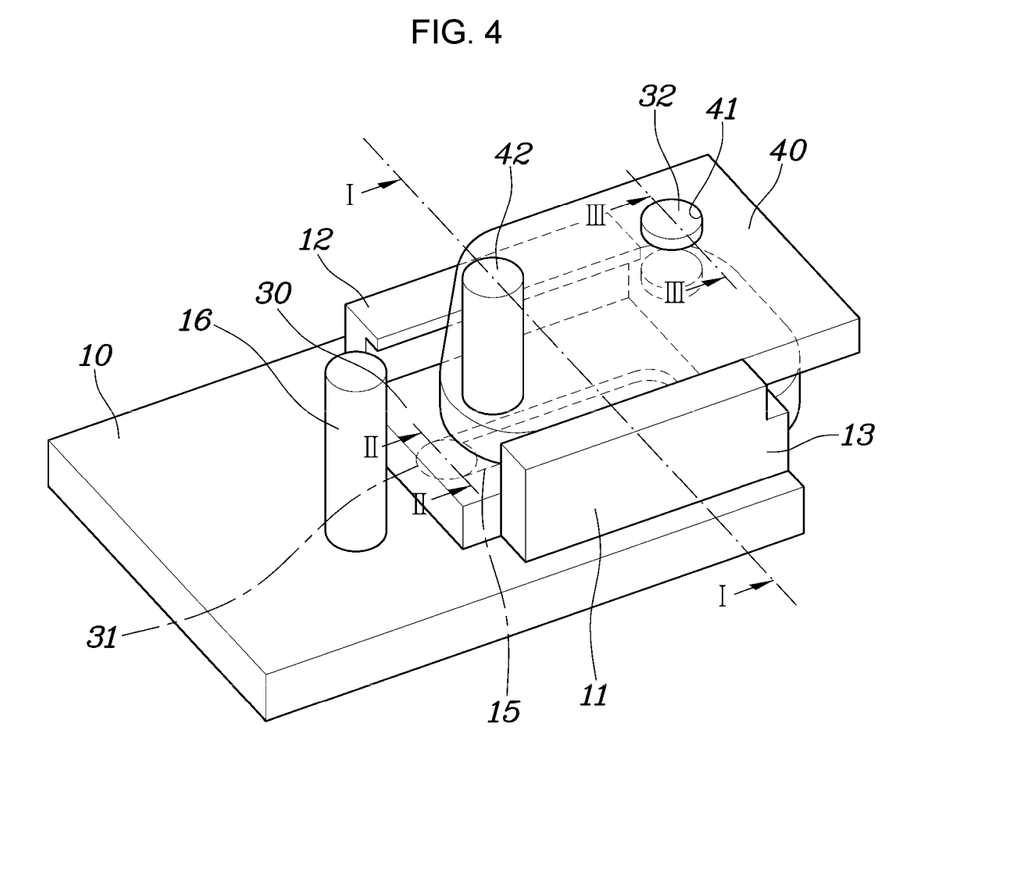
FIG. 4 is a perspective view exemplarily illustrating an assembly of the base, the slider, and the door bracket according to an exemplary embodiment of the present invention.
Figure 5:
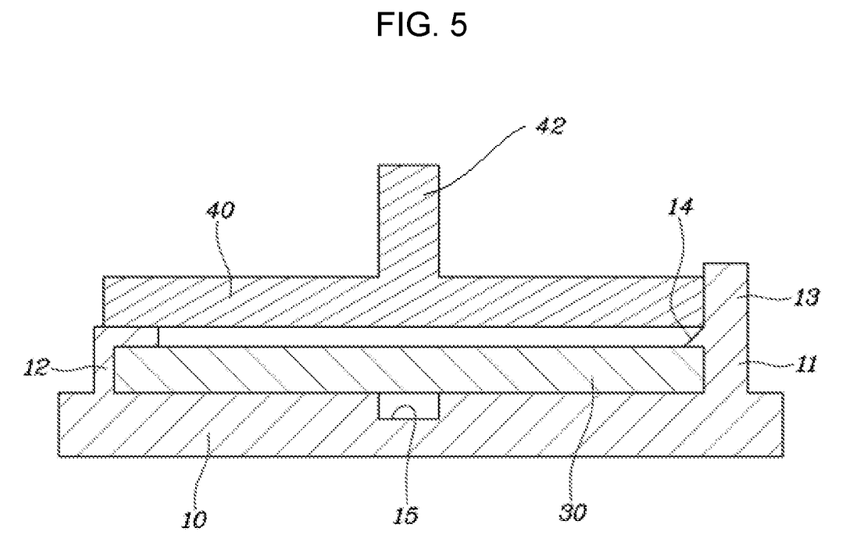
FIG. 5, FIG. 6 and FIG. 7 are cross-sectional views taken along line I-I, line II-II, and line in FIG. 4.
Figure 6:
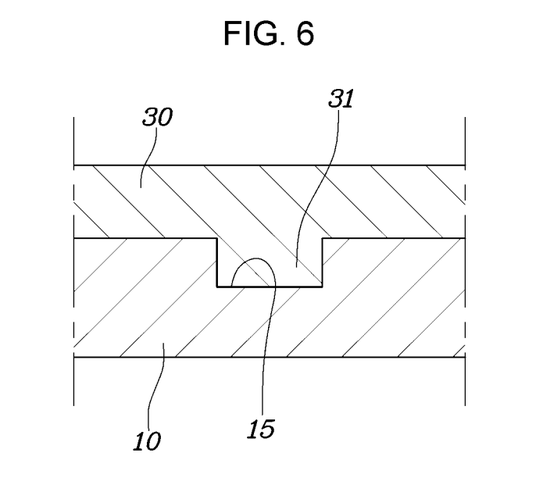
Figure 7:
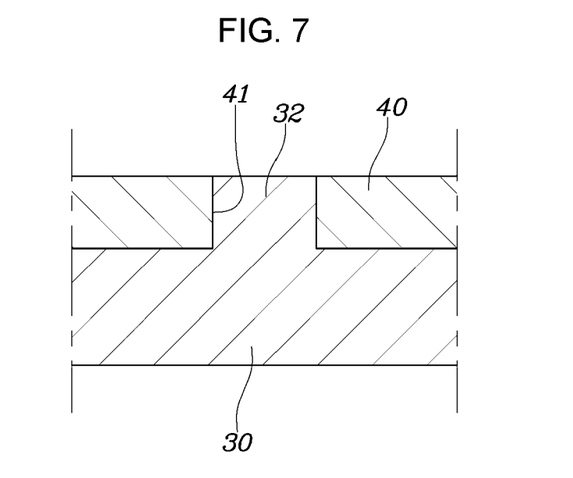
Figure 8:
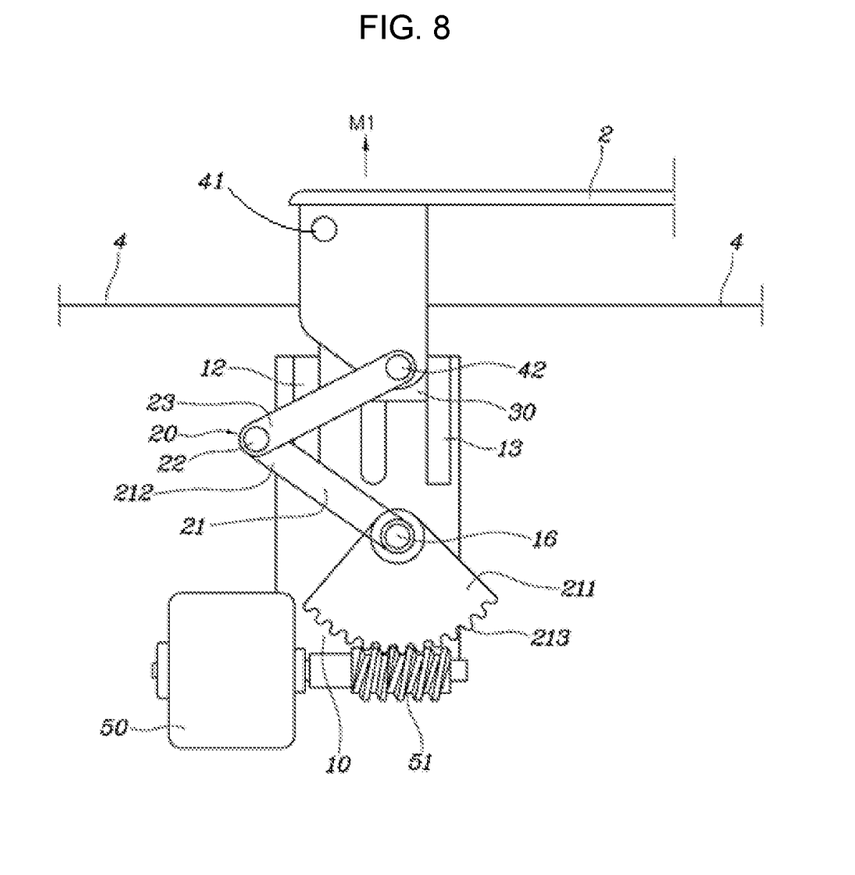
FIG. 8 illustrates a position in which the fuel filler door is partially opened from the position in FIG. 1, in a response to the fuel filler door having linearly moved to open the fuel filler housing.
Figure 9:
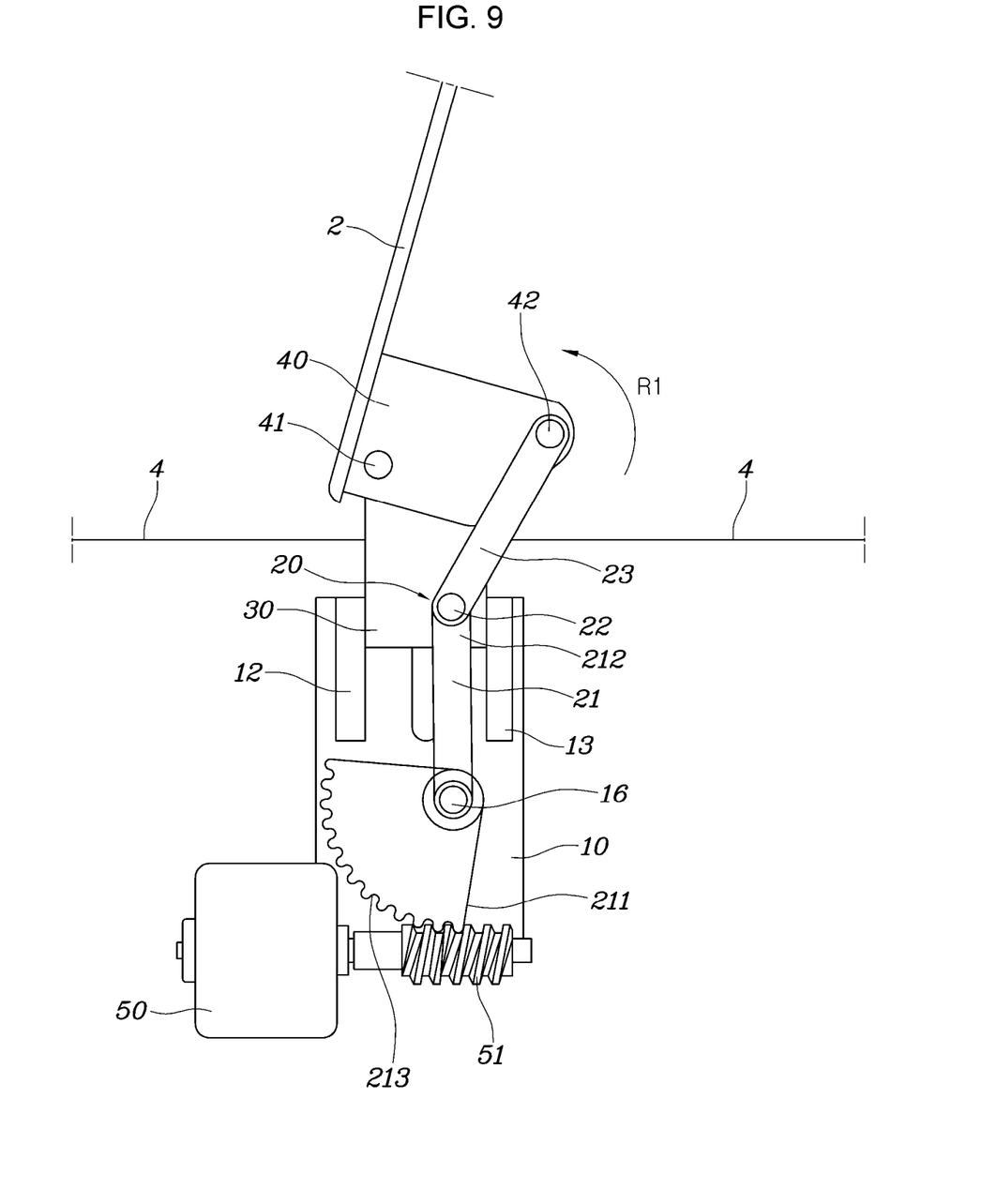
FIG. 9 illustrates a position in which the fuel filler door is completely opened, in a response to the fuel filler door having rotated from the position in FIG. 8.

FIGS. 1, 2, and 6 illustrate a position in which fuel filler housing 1 is closed by the fuel filler door 2. FIG. 8 illustrates a position in which the link mechanism 20 has pivoted and the door bracket 40 and the slider 30 have linearly moved with respect to the base 10 in a response to the operation of the motor 50, so that the fuel filler door 2 has linearly moved, partially opening the fuel filler housing 1. FIG. 9 illustrates a position in which the slider 30 has completed the linear movement due to continued pivoting of the link mechanism 20 and the fuel filler door 2 have rotated in a response to pivoting of the door bracket 40 with respect to the slider 30, completely opening the fuel filler housing 1.

In the position illustrated in FIG. 1 and FIG. 2, when a driver manipulates the switch 3 on the internal of the cabin, the motor 50 rotates forwards, and the worm wheel gear 213 engaged with the worm gear 51 rotates in a response to rotation of the motor 50. In a response to rotation of the worm wheel gear 213, the first link 21 including the worm wheel gear 213 pivots about the second protrusion 16 of the base 10, so that one end portion 211 and the other end portion 212 rotate clockwise.

When the first link 21 pivots clockwise about the second protrusion 16 using power supplied by the motor 50, the second link 23 pivots counterclockwise about the hinge 22, as illustrated in FIG. 8. Consequently, the second link 23 is spread away from the first link 21, increasing the distance between the first link 21 and the second link 23.

When the second link 23 pivots counterclockwise about the hinge 22, the door bracket 40 connected to the second link 23 linearly moves in an upward direction in FIG. 8, with one edge portion thereof being guided by the support guide 13. When the door bracket 40 linearly moves, the slider 30 connected to the door bracket 40 linearly moves along with the door bracket 40 in the same direction thereof, with both edge portions thereof being guided by the first guide 11 and the second guide 12 of the base 10.

The upward linear movement of the slider 30 continues before the stopper protrusion 31 touches one end portion of the guide grooves 15. Due to the upward linear movement of the slider 30 and the door bracket 40, the fuel filler door 2 connected to the door bracket 40 linearly moves in an upward direction as indicated by arrow Ml. Consequently, the fuel filler door 2 linearly moves from the fuel filler housing 1, being partially opened.

In a position in which the fuel filler housing 1 is partially opened in a response to linear movement of the fuel filler door 2 as illustrated in FIG. 8, the first link 21 and the second link 23 extend to be substantially linear, as illustrated in FIG. 9, due to continued pivoting of the link mechanism 20. In the present process, linear movement of the slider 30 is completed as the stopper protrusion 31 is restrained by the guide groove 15. The door bracket 40 moves out of the support guide 13 to pivot counterclockwise about the first protrusion 32, as indicated by arrow R1 in FIG. 9. The fuel filler door 2 connected to the door bracket 40 also rotates counterclockwise. Consequently, the fuel filler housing 1 is completely opened.

Furthermore, when the motor 50 rotates backwards in a response to the switch 3 being manipulated, a closing operation of the opened fuel filler door 2 is performed. The fuel filler door 2 rotates clockwise in the order reverse to the opening operation. As the fuel filler door 2 continues linearly moving downwards, the fuel filler housing 1 is closed by the closed fuel filler door 2 as illustrated in FIG. 1 and FIG. 2.

According to the exemplary embodiment of the present invention as described above, the opening operation and the closing operation of the fuel filler door 2 are automatically performed using power supplied by the motor 50 when the driver manipulates the switch 3 provided in the cabin. The present configuration can advantageously improve the convenience of the driver.

Furthermore, according to the exemplary embodiment of the present invention, all components of the device connecting the fuel filler housing 1 and the fuel filler door 2 are accommodated in the fuel filler housing 1. Even when the fuel filler door 2 is opened, none of the base 10, the motor 50, and the first link 21 are exposed externally, and only portions of the second link 23, the slider 30, and the door bracket 40 are exposed externally. The present configuration can consequently improve an external appearance.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An opening and closing device for a fuel filler door, the opening and closing device comprising:
    a base fixedly mounted on a fuel filler housing;
    a link mechanism pivotably connected to the base;
    a slider slidably connected to the base; and
    a door bracket pivotably connected to the link mechanism and the slider and fixedly connected to the fuel filler door.

2. The opening and closing device of claim 1, further including:
    an actuator fixedly mounted on the fuel filler housing and engaged to the link mechanism,
    wherein the actuator to which a switch is connected rotates forwards or backwards to provide power for pivoting the link mechanism with respect to the base in a response to the switch being manipulated.

3. The opening and closing device of claim 1,
    wherein, when the door bracket linearly moves with respect to the base in a response to pivoting of the link mechanism, the slider linearly moves along with the door bracket, and the fuel filler door linearly moves with respect to the fuel filler housing in an opening and closing direction thereof, and
    wherein, when the door bracket pivots with respect to the slider in a response to pivoting of the link mechanism, the fuel filler door rotates with respect to the fuel filler housing in the opening and closing direction thereof.

4. The opening and closing device of claim 1,
    wherein the base includes:
        a first guide and a second guide extending in the opening and closing direction of the fuel filler door to be in parallel to each other, wherein the slider is engaged to the first guide and the second guide; and
        a support guide mounted on the first guide to extend in a same direction as the first guide, the door bracket being engaged to the support guide,
    wherein the slider linearly moves, with first and second edge portions thereof being guided by the first guide and the second guide, respectively, and
    wherein the door bracket linearly moves, with one edge portion thereof being guided by the support guide.

5. The opening and closing device of claim 1,
    wherein the base includes a guide groove extending in the opening and closing direction of the fuel filler door, and
    wherein the slider includes a stopper protrusion protruding from a first surface of the slider in a predetermined direction thereof, the stopper protrusion being inserted into and moving along the guide groove.

6. The opening and closing device of claim 5,
    wherein the slider includes a first protrusion protruding from a second surface in an opposite direction of the stopper protrusion,
    wherein a first hole into which the first protrusion is inserted is provided in a portion of the door bracket, and
    wherein the door bracket is pivotably connected to the slider via the first protrusion and the first hole.

7. The opening and closing device of claim 2, wherein the link mechanism includes:
    a first link fitted into a second protrusion protruding from the base, wherein the first link is coupled to the actuator to pivot about the second protrusion using power supplied by the actuator; and
    a second link pivotably connected to the first link via a hinge and a second end portion pivotably fitted around a third protrusion protruding from the door bracket.

8. The opening and closing device of claim 7,
    wherein the first link has a first end portion and a second end portion, and
    wherein the first end portion includes a fan-shaped worm wheel gear to be engaged with a worm gear of the actuator, and the second end portion is pivotably connected to the second link via the hinge.

9. The opening and closing device of claim 7,
    wherein none of the base, the actuator, and the first link are exposed externally when the fuel filler door is opened.

10. The opening and closing device of claim 2,
wherein, when the actuator rotates forwards, the fuel filler door rotates after having linearly moved in a direction away from the fuel filler housing, so that the fuel filler housing is opened, and
wherein, when the actuator rotates backwards in a position in which the fuel filler housing is opened, the fuel filler door linearly moves toward the fuel filler housing after having rotated in an order reverse to an operation of opening the fuel filler housing, so that the fuel filler housing is closed.

11. The opening and closing device of claim 6, wherein the link mechanism further includes:
a first link fitted into a second protrusion protruding from the base, wherein the first link is coupled to the actuator to pivot about the second protrusion using power supplied by the actuator; and
a second link pivotably connected to the first link via a hinge and a second end portion pivotably fitted around a third protrusion protruding from the door bracket.

12. The opening and closing device of claim 11, wherein a maximum distance between the first protrusion and the second protrusion when the fuel filler housing is opened is shorter than a total length of the first link and the second link when the fuel filler housing is opened, so that the fuel filler door rotates after having linearly moved in a direction away from the fuel filler housing and then the fuel filler housing is opened.

\* \* \* \* \*